Nov. 5, 1946.  C. C. FUERST  2,410,649

SETTING SHUTTER DRIVE

Filed Sept. 1, 1945

CARL C. FUERST
INVENTOR

BY
ATTORNEYS

Patented Nov. 5, 1946

2,410,649

UNITED STATES PATENT OFFICE 2,410,649

SETTING SHUTTER DRIVE

Carl C. Fuerst, Rochester, N. Y., assignor to Eastman Kodak Company, Rochester, N. Y., a corporation of New Jersey Application September 1, 1945, Serial No. 614,041

6 Claims. (Cl. 95—63)

This invention relates to photography and more particularly to shutters for cameras. One object of my invention is to provide a shutter of the setting type in which the shutter-driving mechanism is simple, consists of but few parts, and is capable of producing exposure of relatively high speeds. Another object of my invention is to provide a shutter of the setting type in which an operating lever is used to both set and release the shutter mechanism. Another object of my invention is to provide a comparatively direct drive between the master member and the shutter blades, and other objects will appear from the following specification, the novel features being particularly pointed out in the claims at the end thereof.

This application is for an improvement over the shutter shown in my recently-issued Patent 2,382,623 for Automatic shutters, granted August 14, 1945. In this application certain features are similar to parts of the shutter shown in my patent, but the shutter has been improved, both in speed and in operation, by changing the driving mechanism from an automatic type, as shown in my patent, to a setting type as shown in the present application.

Coming now to the drawing wherein like reference characters denote like parts throughout:

Figure 1:
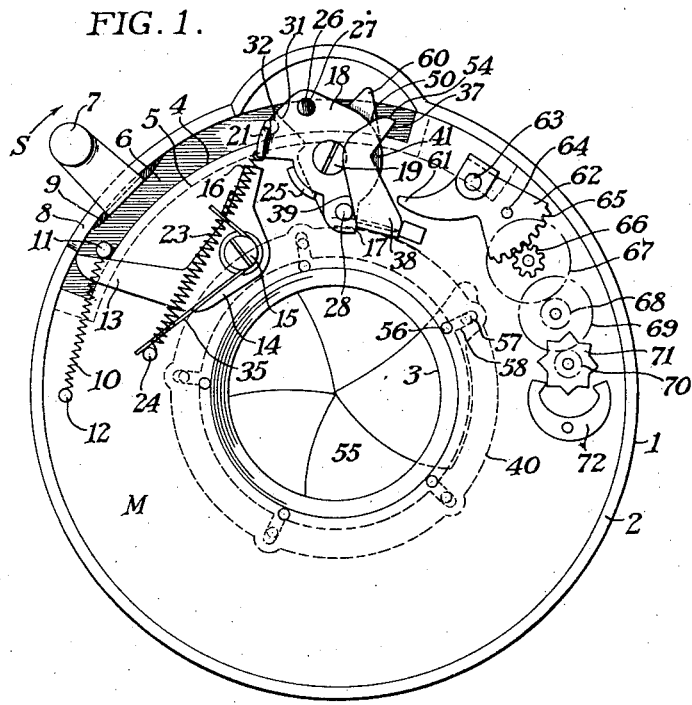
Fig. 1 is a top plan view of a shutter with the shutter-cover removed, and showing the shutter blade driving mechanism in a normal unset position of rest.

As pointed out in my above-mentioned patent, it has ordinarily been difficult to obtain relatively high speeds, such as a true 1/150 part of a second, with shutters of the automatic type, although it is well known that with shutters of the setting type much higher speeds can usually be obtained. With my present setting type of shutter, I have been able not only to very considerably increase the speed of the shutter but, in addition, I have provided a shutter in which a very delicate pressure on the operating lever is sufficient to release the shutter after it has been set by moving the handle, carried by the operating lever, in an opposite direction to set the master member and tension its spring.

My improved shutter consists of a shutter casing designated broadly as 1 provided with an upstanding flange 2 extending around the periphery of the shutter and provided with an exposure aperture 3 through which light passes to make an exposure.

The shutter preferably includes a mechanism plate M and this mechanism plate is cut away at 4 to expose a slideway, or track, 5 which is used to guide an operating lever 6 through a path of movement.

The operating lever 6 may be provided with a handle 7 extending through the slot 8 in the wall 2. The shutter track, or guideway, 5 may consist of a groove cut in the bottom wall 9 of the shutter and I prefer to provide a spring 10 anchored to the pin 11 carried by the operating lever and to a second pin 12 carried by the mechanism plate M. The spring 10 is of quite light weight and exerts only sufficient force upon the operating lever 6 to normally hold the pin 11 in the position shown in Fig. 1 against one arm 13 of a latch 14 pivotally mounted at 15 to the mechanism plate M and having a latching end 16 adapted to engage a latch element 17 carried by the master member 18.

Figure 5:
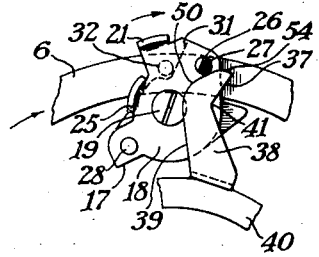
Fig. 5 is a fragmentary detail view showing the relationship of the master member blade ring arm and operating lever showing these members in the position they assume as the shutter is being partially set.
Figure 3:
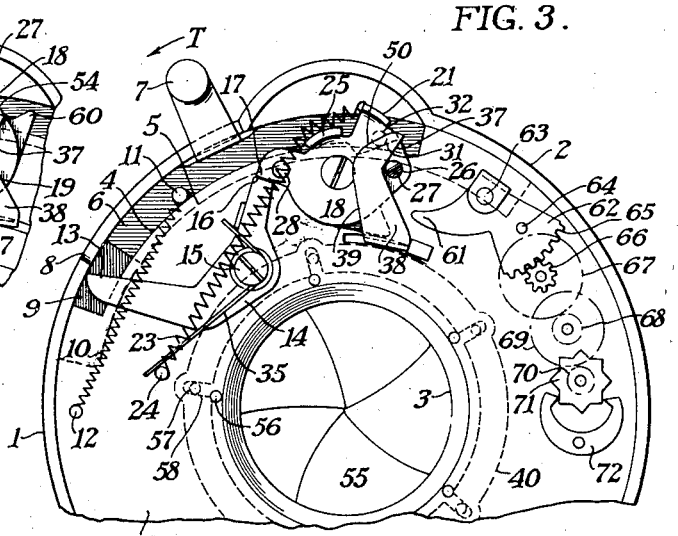
Fig. 3 is a fragmentary view similar to Fig. 1 but with the parts shown in their set position before the operating member is released.
Figure 4:
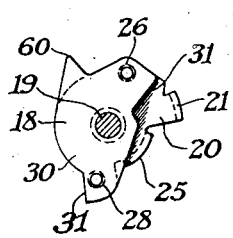
Fig. 4 is a bottom plan view of the master member removed from the shutter casing.

The master member 18 is an oscillatable disc-like member carried upon a stud 19 and this master member is preferably made in two parts as shown in Fig. 4. The upper part 20 carries an upstanding flange 21 to which the power spring 23 is attached, the other end of the power spring 23 being attached to a pin 24 carried by the mechanism plate. There is also an upstanding flange 25 forming a guide for the spring 23 when the master member is in the set position shown in Fig. 3. In addition to the flanges 21 and 25, the plate 20 carries an opening pin 26 which is provided with a downwardly-beveled surface 27 and a closing pin 28. The second section of the master member 18 is the lower section 30 which consists of a substantial plate having a straight edge 31 adapted to be engaged by a protuberance 32 here shown as a pin extending upwardly from the operating lever as best shown in Figs. 1 and 5. In addition, the plate 30 is provided with a latch element 31 which also coincides with the latch element 17 on the upper plate 20. For convenience, these two surfaces form a single latch element but, of course, if desired this latch element could be formed on either of the two plates with the same result.

Figure 6:
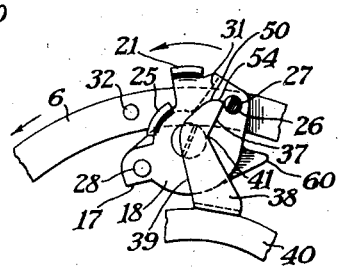
Fig. 6 is a view similar to Fig. 5 but with the parts in the position they assume just after the master member has been released.
Figure 2:
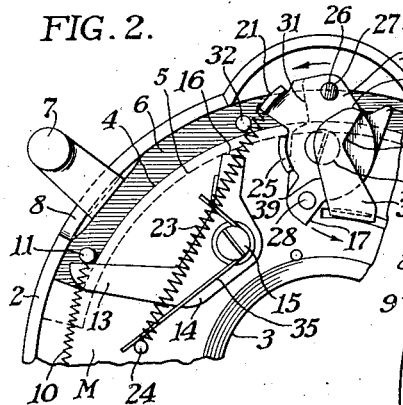
Fig. 2 is a fragmentary detail view similar to Fig. 1 but with the parts in the position they assume when the shutter blades have been driven to an open position.

With the shutter parts in the position shown in Fig. 1, after the operating handle 7 is moved in the direction shown by the arrow S, the operating arm 6 will carry the pin 32 in engagement with the straight edge 31, thus turning the master member against the action of spring 23 until a set position is reached in which the latch 14 will engage the latch element 17 of the master member and hold it in its set, or Fig. 3, position. When the handle 7 is released, it will move in the direction shown by the arrow T in Fig. 3 because of the light spring 10. This spring will merely return the operating arm 6 from its Fig. 3 position to its Fig. 1 position and the spring is not strong enough to overcome the action of spring 35 holding the latch 14 in its latching position. However, further movement of the handle 7 in the direction of the arrow T, as indicated in Fig. 2, will release the latch 14 permitting the master member to rapidly swing in a counter-clockwise direction. This action causes the pin 26 to engage the straight edge 37 of the blade ring arm 38 swinging the blade ring arm in a counter-clockwise direction until, as shown in Fig. 6, the pin 27 slips off the straight edge 37 which will occur when the shutter blades are open. Continued movement of the master member 18 causes the closing pin 28 to engage the straight edge 39 and drive the blade ring arm 38 back to its initial position as indicated in Fig. 1, thus closing the blades and completing the exposure.

The blade ring arm 38 extends outwardly in a generally radial direction from the blade ring 40 from a point near the exposure aperture 3 to a point near the periphery of the shutter and is generally hook shaped in that the end of the lever is bent at 41 so that there are three pin-engaging surfaces. The surface 37 against which the opening pin moves until it slips off, as described above, is on one side of the arm 38. On the other side of the arm 38 there is the surface 50 which is engaged by the beveled edge 27 of the opening pin 26 when the shutter is set, this beveled surface causing the blade ring arm 38 to spring outwardly the slight distance needed to permit the pin 26 to pass under this arm and into its set position. Below the bent portion 41 of the arm 38 there is a straight edge 39 which is engaged by the closing pin 28 after the pin 26 has slipped off the surface 37.

The extreme end of the arm 38 has been shaped to avoid any restraining contact between the arm 38 and the pin 26 when the pin 26 reaches the slip-off position just past the position shown in Fig. 6. This surface 54 has been rounded as shown so that the pin 26 slips off the straight edge 37 and immediately permits the master member 18 to speed up so that the closing pin 28 is moving rapidly when it strikes the straight edge 39, thereby closing the shutter blades quickly.

The shutter blades 55 are of a known type in which each blade is pivotally mounted upon a pin 56 and includes a pin 57 engaging a slot 58 carried by the blade ring 40 which also carries the blade ring arm 38. Thus, this shutter is of the type in which the shutter blades are moved in one direction to open the exposure aperture 3 and in a reverse direction to close the exposure aperture.

For exposures of the slower automatic variety, the master member 18 may be provided with an offset flange 60 adapted to engage a tail 61 on a gear segment 62 pivotally mounted at 63 on the mechanism plate M. This gear segment may be rocked by a pin 64 in a known manner to and from the path of movement of the lug 60 to retard the movement of the master member to a greater, or lesser, extent. The teeth 65 may mesh with a series of gears 66, 67, 68, 69, and 70, the latter carrying a starwheel 71 with which a pallet 72 may cooperate to produce a further retarding effect. Since this retarding device and gear train forms no part of the present invention, it need not be further described.

The shutter drive mechanism, as will be seen from the above description and drawing, is extremely simple since it employs only an operating lever slidably mounted to move through a path, a master member at one end of the operating lever path and a latch member at the other end of the operating lever path, the latch member having a latch element adapted to engage the master member when in a set position. An operator, by moving the handle 7 in a clockwise direction with reference to Fig. 1, may engage the pin 32 with the straight edge 31 turning the master member 18 until it reaches the latched set position of Fig. 3. The shutter is now ready for an exposure. By moving the lever 7 in a counter-clockwise direction, the pin 11 is brought into engagement with the arm 13 of the latch 14 and comparatively slight pressure on the handle 7 releases the latching elements so that the master member is free to turn. As the master member turns upon its pivot 19 the pin 26 drives the blade ring arm 38 by riding along the straight edge 37 until it slips off the end of the arm, this movement being caused by the pin turning on its relatively short radius while the blade ring arm 38 turns on a considerably greater radius. As the pin slips off the straight edge 37, the master member may quickly accelerate since the blades have been opened and since the closing pin 28 is still some distance from the straight edge 39. Thus, when the pin 28 reaches the straight edge 39 it is moving rapidly and the blade ring arm 38 will be quickly moved to its initial position of rest at which time the blades will have closed. This movement takes place very rapidly and with a comparatively light master member spring 23 I have found it possible to obtain an exposure of at least 1/250 of a second, and still faster exposures are obtainable by increasing the power of spring 23.

The single oscillatable operating lever 6 is simple in construction and is of light weight and is used for both setting and tripping the shutter. One advantage of this construction is that the master member does not have to move the arm by which it is set because the lever 6 has moved away from the master member before the master member can be tripped. In the present instance, the slideway 5 on the shutter is arcuate in shape and it is concentric with the exposure aperture since I find this construction simple to make. It should be noticed that, as in the case of my patent above mentioned, the master member directly engages an arm carried by the shutter blade, thus eliminating some of the usual mechanism used in shutters, the inertia of which must be overcome by the master member spring. Unlike my patent above mentioned, the master member setting lever does not have to be moved by the master member, thus increasing the power of the master member without increasing the power of the spring driving it.

While this shutter is not capable of the extremely high speeds generally possible only where the shutter blades are driven in a single direction to both open and close the exposure aperture, nevertheless this construction permits extremely high speeds for a shutter of the type in which the shutter blades open while moving in one direction, reverse their direction of movement and close, moving in this reversed direction.

I claim:

1. A shutter of the setting type comprising, in combination, a casing having an exposure aperture and an outer rim, an operating lever operably mounted to move through a fixed path on the shutter casing, a master member having a latch element and flange thereon and pivotally mounted at one end of the path of movement of the operating lever, a pivoted latch for the master member including an arm extending across the path of movement of the operating lever at the opposite end from the master member, a handle outside the shutter and connected to the operating lever for moving the lever in two directions and through its path of movement to engage and operate the latch arm at one end of its path of movement for releasing the master member latch, and to engage and move the master member by its flange to a set position determined by the latch element engaging the pivoted latch when moved to its other end of its path of movement, said master member also carrying an opening pin toward the periphery of the shutter and a closing pin toward the aperture of the shutter, a blade ring, an arm thereon extending in a generally radial direction and positioned to be engaged by the opening and closing pins, each pin having an arcuate path of movement about the master member pivot, the movement of the master member in one direction causing the opening pin to move and slip off the blade ring arm, further movement of the master member moving the blade ring arm in an opposite direction by the closing pin, pivotally mounted shutter blades operably connected to the blade ring carrying the arm to be operable thereby to open and close the exposure aperture.

2. A shutter of the setting type comprising, in combination, a casing having an exposure aperture and an outer rim, an operating lever operably mounted to move through a fixed path on the shutter casing, a master member having a latch element and flange thereon and pivotally mounted at one end of the path of movement of the operating lever, a pivoted latch for the master member including an arm extending across the path of movement of the operating lever at the opposite end from the master member, a handle outside the shutter and connected to the operating lever for moving the lever in two directions and through its path of movement to engage and operate the latch arm at one end of its path of movement for releasing the master member latch, and to engage and move the master member by its flange to a set position determined by the latch element engaging the pivoted latch when moved to its other end of its path of movement, said master member also carrying an opening pin beveled on one side and carried by the master member toward the periphery of the shutter and a closing pin toward the aperture of the shutter, a blade ring, an arm thereon extending in a generally radial direction and positioned to be engaged by the opening and closing pins, each pin having an arcuate path of movement about the master member pivot, the movement of the master member in one direction causing the opening pin to move and slip off the blade ring arm, further movement of the master member moving the blade ring arm in an opposite direction by the closing pin, movement of the opening blade ring pin when the master member is moved in a reverse direction causing the blade ring pin beveled surface to pass under the blade ring arm without turning the blade ring, pivotally mounted shutter blades operably connected to the blade ring carrying the arm to be operable thereby to open and close the exposure aperture.

3. The shutter defined in claim 1 characterized by the operable mount for the operating lever on the shutter comprising a slotted guideway carried by the shutter casing to receive and guide the operating lever through a fixed path of movement.

4. The shutter defined in claim 1 characterized by the operable mount for the operating lever on the shutter comprising a slotted guideway carried by the shutter casing to receive and guide the operating lever through a fixed path of movement, said guideway being concentric with the exposure aperture and extending only part way around said exposure aperture.

5. A shutter as defined in claim 1 characterized by the blade ring arm including a pair of opening pin-engaging surfaces on opposite side, the end of said arm having a rounded surface shaped to prevent restraining contact between the opening pin and the end of the arm when the pin-engaging surface on one side slips off the arcuately moving opening pin during its exposure-making movement upon release of the master member.

6. A shutter as defined by claim 1 characterized by the blade ring arm including a bent end, one side of the arm end having opening pin-engaging surfaces on both sides connected by a rounded end shaped to prevent restraining contact between the end of the arm and the opening pin at the slip off of the pin from the arm, the engaging surface on the arm side facing the closing pin being extended from the bent end of the arm towards the exposure aperture to be struck by the closing pin after the slip off between the arm and the opening pin.

CARL C. FUERST.